(12) United States Patent
Fradette et al.

(10) Patent No.: US 8,192,531 B2
(45) Date of Patent: *Jun. 5, 2012

(54) $CO_2$ ABSORPTION SOLUTION

(75) Inventors: Sylvie Fradette, Pintendre (CA); Olivera Ceperkovic, Ste-Foy (CA)

(73) Assignee: CO2 Solutions Inc., Quebec, QC (CA)

( * ) Notice: Subject to any disclaimer, the term of this patent is extended or adjusted under 35 U.S.C. 154(b) by 205 days.

This patent is subject to a terminal disclaimer.

(21) Appl. No.: 12/763,105

(22) Filed: Apr. 19, 2010

(65) Prior Publication Data

US 2010/0203619 A1     Aug. 12, 2010

Related U.S. Application Data

(63) Continuation of application No. 11/817,067, filed as application No. PCT/CA2006/000274 on Feb. 24, 2006, now Pat. No. 7,740,689.

(60) Provisional application No. 60/655,446, filed on Feb. 24, 2005.

(51) Int. Cl.
*B01D 53/14* (2006.01)
*B01D 53/62* (2006.01)

(52) U.S. Cl. ........... 95/236; 423/226; 423/228; 252/184

(58) Field of Classification Search ............... 95/236; 423/220, 226, 228, 437.1; 252/184
See application file for complete search history.

(56) References Cited

U.S. PATENT DOCUMENTS

| | | | |
|---|---|---|---|
| 4,112,051 A | 9/1978 | Sartori et al. | |
| 4,112,052 A | 9/1978 | Sartori et al. | |
| 6,203,599 B1 | 3/2001 | Schubert et al. | |
| 6,524,843 B1 | 2/2003 | Blais et al. | |
| 6,890,497 B2 | 5/2005 | Rau et al. | |
| 7,740,689 B2 * | 6/2010 | Fradette et al. | ............ 95/236 |
| 2003/0224504 A1 | 12/2003 | Blais et al. | |
| 2004/0029257 A1 | 2/2004 | Dutil et al. | |
| 2004/0219090 A1 | 11/2004 | Dziedzic et al. | |
| 2011/0189750 A1 | 8/2011 | Fradette et al. | |
| 2012/0003722 A1* | 1/2012 | Polak et al. | ............ 435/257.1 |
| 2012/0009646 A1* | 1/2012 | Novick et al. | ............ 435/188 |
| 2012/0064610 A1* | 3/2012 | Vitse et al. | ............ 435/266 |

FOREIGN PATENT DOCUMENTS

| | | |
|---|---|---|
| CA | 2509989 | 7/2004 |
| EP | 0315468 A1 | 10/1989 |
| EP | 0558019 A2 | 1/1993 |
| WO | 2004028667 A1 | 4/2004 |
| WO | 2004056455 A1 | 7/2004 |

OTHER PUBLICATIONS

Allen, J.P., "Investigation of the enhancement of carbon dioxide absorption by amines with the enzyme carbonic anhydrase," Technical Report AFFDL-TR-66-23, May 1966.
Allen, J.P., "An enzymatic concept for CO2 control in closed environmental control systems," Technical Report AFFDL-TR-65-48, Aug. 1965.
Graf, G., "Regenerative control of CO2 in air by carbonic anhydrase," Technical Report AFFDL-TR-66-62, May 1966.
Dean, et al., "Batch absorption of CO2 by free and microencapsulated carbonic anhydrase," Ind. Eng. Chem., Fundam., vol. 16, No. 4, pp. 452-458, 1977.
Donaldson & Quinn, "Kinetic constants determined from membrane transport measurements: carbonic anhydrase activity at high concentrations," Proc. Nat. Acad. Sci. USA, vol. 71, No. 12, pp. 4995-4999, Dec. 1974.
Kohl, et al., "Gas Purification", Dec. 31, 1997, Gulf Publishing Company, Houston Texas, XP002665289, ISBN: 0-88415-220-0, pp. 1187-1189, tables 14-1.

* cited by examiner

*Primary Examiner* — Frank Lawrence, Jr.
(74) *Attorney, Agent, or Firm* — Knobbe, Martens, Olson & Bear, LLP

(57) ABSTRACT

Disclosed is a formulation for the absorption of $CO_2$, which comprises water, at least one $CO_2$ absorption compound and a carbonic anhydrase as an activator to enhance the absorption capacity of the $CO_2$ absorption compound. The invention also concerns the use of carbonic anhydrase, in a $CO_2$ absorption solution to increase the $CO_2$ absorption rate of such solution.

19 Claims, 3 Drawing Sheets

CO₂ ABSORPTION SOLUTION

FIELD OF THE INVENTION

The present invention relates generally to solutions for absorbing $CO_2$ for extraction and purification of gases. More particularly, it relates to a $CO_2$ absorption solution containing a biocatalyst, namely carbonic anhydrase as an activator, to increase $CO_2$ absorption rate. It also concerns the use of a biocatalyst, namely carbonic anhydrase, in a $CO_2$ absorption solution to increase the $CO_2$ absorption rate of such solution.

BACKGROUND OF THE INVENTION $CO_2$ removal from a gas stream may be obtained using chemical and physical absorption processes. Chemical absorption of $CO_2$ may be performed with amine based processes and alkaline salt-based processes. In such processes, the absorbing medium reacts with the absorbed $CO_2$. Amines may be primary, secondary, and tertiary. These groups differ in their reaction rate, absorption capacity, corrosion, degradation, etc. In alkaline salt-based processes, the most popular absorption solutions have been sodium and potassium carbonate. As compared to amines, alkaline salt solutions have lower reaction rates with $CO_2$.

Alkanolamines in aqueous solution are another class of absorbent liquid for carbon dioxide removal from gaseous mixtures. Alkanolamines are classified as primary, secondary, or tertiary depending on the number of non-hydrogen substituents bonded to the nitrogen atom of the amino group. Monoethanolamine ($HOCH_2\ CH_2NH_2$) is an example of a well-know primary alkanolamine. Widely used secondary alkonalamine include diethanolamine (($HOCH_2CH_2)_2NH$). Triethanolamine (($HOCH_2CH_2)_3N$) and methyldiethanolamine (($HOCH_2CH_2)_2NCH_3$) are examples of tertiary alkanolamines which have been used to absorb carbon dioxide from industrial gas mixtures. Molecular structures of sterically hindered amines are generally similar to those of amines, except sterically hindered amines have an amino group attached to a bulky alkyl group. For example, 2-amino-2-methyl-1-propanol ($NH_2$—$C(CH_3)_2CH_2OH$).

With primary and secondary alkanolamines (Pinola et al. Simulation of pilot plant and industrial $CO_2$-MEA absorbers, Gas Separation & Purification, 7(1), 1993; Barth et al., Kinetics and mechanisms of the reactions of carbon dioxide with alkanolamines; A discussion concerning the cases of MDEA and DEA, Chemical Engineering Science, 39(12), pp. 1753-1757, 1984) the nitrogen reacts rapidly and directly with carbon dioxide to bring the carbon dioxide into solution according to the following reaction sequence:

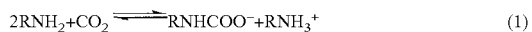

$$2RNH_2 + CO_2 \rightleftharpoons RNHCOO^- + RNH_3^+ \qquad (1)$$

where R is an alkanol group. This reaction is the cornerstone of the present invention, as it is the one accelerated by carbonic anhydrase. The carbamate reaction product ($RNHCOO^-$) must be hydrolysed to bicarbonate ($HCO_3^-$) according to the following reaction:

$$RNHCOO^- + H_2O \rightleftharpoons RNH_2 + HCO_3^- \qquad (2)$$

In forming a carbamate, primary and secondary alkanolamine undergo a fast direct reaction with carbon dioxide which makes the rate of carbon dioxide absorption rapid. In the case of primary and secondary alkanolamines, formation of carbamate (reaction 1) is the main reaction while hydrolysis of carbamate (reaction 2) hardly takes place. This is due to stability of the carbamate compound, which is caused by unrestricted rotation of the aliphatic carbon atom around the aminocarbamate group. According to U.S. Pat. No. 4,814,104 the overall reaction for the alkanolamines is written as:

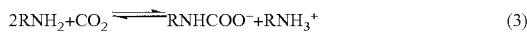

$$2RNH_2 + CO_2 \rightleftharpoons RNHCOO^- + RNH_3^+ \qquad (3)$$

For the sterically hindered amines both reactions 1 and 2 play major roles on the $CO_2$ absorption process. In contrast with the alkanolamines, the rotation of the bulky alkyl group around the aminocarbamate group is restricted in sterically hindered amines. This results in considerably low stability of the carbamate compound. The carbamate compound is thus likely to react with water and forms free amine and bicarbonate ions (reaction 2). Due to the occurrence of reaction 2, only 1 mol of the sterically hindered amine instead of 2 mol of alkanolamine is required to react with 1 mol of $CO_2$. The overall reaction for sterically hindered amines can be written as (Veawab et al., "Influence of process parameters on corrosion behaviour in a sterically hindered amine—$CO_2$ system", Ind. Eng. Chem. Res., V 38, No. 1; 310-315; 1999; Park et al., Effect of steric Hindrance on carbon Dioxide Absorption into New Amine Solutions: Thermodynamic and Spectroscopic Verification and NMR Analysis, Environ. Science Technol. 37, pp. 1670-1675, 2003; Xu, Kinetics of the reaction of carbon dioxide with 2-amino-2-methyl-1-propanol solutions, Chemical Engineering Science, 51(6), pp. 841-850, 1996):

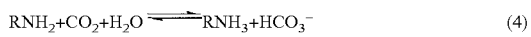

$$RNH_2 + CO_2 + H_2O \rightleftharpoons RNH_3^+ + HCO_3^- \qquad (4)$$

Unlike primary and secondary alkanolamines, tertiary alkanolamines cannot react directly with carbon dioxide, because their amine reaction site is fully substituted with substituent groups. Instead, carbon dioxide is absorbed into solution by the following slow reaction with water to form bicarbonate (U.S. Pat. No. 4,814,104; Ko, J. J. et al., Kinetics of absorption of carbon dioxide into solutions of N-methyldiethanolamine+water, Chemical Engineering Science, 55, pp. 4139-4147, 2000; Crooks, J. E. et al., Kinetics of the reaction between carbon dioxide and tertiary amines, Journal of Organic Chemistry, 55(4), 1372-1374, 1990; Rinker, E. B. et al., Kinetics and modelling of carbon dioxide absorption into aqueous solutions of N-methyldiethanolamine, Chemical Engineering Science, 50(5), pp. 755-768, 1995):

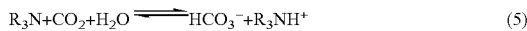

$$R_3N + CO_2 + H_2O \rightleftharpoons HCO_3^- + R_3NH^+ \qquad (5)$$

Physical absorption enables $CO_2$ to be physically absorbed in a solvent according to Henry's law. Such absorption is temperature and pressure dependent. It is usually used at low temperature and high pressures. Typical solvents are dimethylether of polyethylene glycol and cold methanol.

In recent years, a lot of effort has been put to develop new absorption solutions with enhanced $CO_2$ absorption performance. The use of sterically hindered amines, including aminoethers, aminoalcohols, 2-substituted piperidine alcohols and piperazine derivatives, in solution to remove carbon dioxide from acidic gases by scrubbing process was the object of a patent in the late 1970 (U.S. Pat. No. 4,112,052). Yoshida et al. (U.S. Pat. No. 5,603,908) also used hindered amines to remove $CO_2$ from combustion gases, but mainly focused on reducing the energy consumption from the amines regeneration. Fujii et al. (U.S. Pat. No. 6,274,108) used MEA in a process to absorb $CO_2$ from combustion exhaust gases, but were more concerned about the plant design, more specifically storage of the amines and replenishing system. Instead of using amines, Suzuki et al. used various formulations of amino-amides to remove carbon dioxide from gases and absorbent (U.S. Pat. No. 6,051,161).

In literature, some have reported new formulations of absorption solutions for chemical and physical processes. Reports exist about the reduction of corrosion of carbon steel with the use of certain amine compounds (U.S. Pat. No.

6,689,332). These new formulations may imply mixtures of amines (chemical solvent). For instance, U.S. Pat. No. 5,246,619 discloses a way of removing acid gases with a mixture of solvents comprising methyldiethanolamine and methylmonoethanolamine. Mixtures of dialkyl ethers of polyethylene glycol (physical solvent) (U.S. Pat. No. 6,203,599), and mixtures of chemical and physical solvents are reported. GB 1102943, for instance, reports a way of removing $CO_2$ by using a solution of an alkanolamine in a dialkyl ether of a polyalkylene glycol, while U.S. Pat. No. 6,602,443 reduces $CO_2$ concentration from gas by adding tetraethylene glycol dimethyl ether in combination with other alkyl ethers of alkylene glycols. Although U.S. Pat. No. 6,071,484 describes ways to remove acid gas with independent ultra-lean amines, mention is also made that a mixture of amines and physical absorbents can also be used with similar results.

In order to increase the rate of $CO_2$ absorption, especially for aqueous tertiary alkanolamine solutions, promoters have been added to the solutions. Promoters such as piperazine, N,N-diethyl hydroxylamine or aminoethylethanolamine (AEE), is added to an absorption solution (chemical or physical solvent). Yoshida et al. (U.S. Pat. No. 6,036,931) used various aminoalkylols in combination with either piperidine, piperazine, morpholine, glycine, 2-methylaminoethanol, 2-piperidineethanol or 2-ethylaminoethanol. EP 0879631 discloses that a specific piperazine derivative for liquid absorbent is remarkably effective for the removal of $CO_2$ from combustion gases. Peytavy et al. (U.S. Pat. No. 6,290,754) used methyldiethanolamine with an activator of the general formula $H_2N-C_nH_n-NH-CH_2-CH_2OH$, where n represents an integer ranging from 1 to 4. U.S. Pat. No. 6,582,498 describes a wire system to reduce $CO_2$ from gases where absorbent amine solutions and the presence of an activator are strongly suggested. U.S. Pat. No. 4,336,233 relates to a process for removing $CO_2$ from gases by washing the gases with absorbents containing piperazine as an accelerator. Nieh (U.S. Pat. No. 4,696,803) relied on aqueous solution of N-methyldiethanolamine and N,N-diethyl hydroxylamine counter currently contacted with gases to remove $CO_2$ or other acid gases. Kubek et al (U.S. Pat. No. 4,814,104) found that the absorption of carbon dioxide from gas mixtures with aqueous absorbent solutions of tertiary alkanolamines is improved by incorporating at least one alkyleneamine promoter in the solution.

Other ways of enhancing $CO_2$ absorption involve ionic liquids, more specifically a liquid comprising a cation and an anion having a carboxylate function (US 2005/0129598). Bmim-acetate and hmim-acetate are cited as examples.

Mention of enzyme utilization for gas extraction can also be found in the literature (U.S. Pat. No. 6,143,556, U.S. Pat. No. 4,761,209, U.S. Pat. No. 4,602,987, U.S. Pat. No. 3,910,780). Bonaventura et al. (U.S. Pat. No. 4,761,209) used carbonic anhydrase immobilized in a porous gel to remove $CO_2$ in an underwater rebreathing apparatus. Carbonic anhydrase can also be used to impregnate membranes used to facilitate $CO_2$ transfer into water for similar purposes (U.S. Pat. No. 4,602,987, U.S. Pat. No. 3,910,780). Efforts were made to ensure that the active site of the enzymes fixed on the membranes were in direct contact with the gas phase substrate to increase the activity of the enzymes (U.S. Pat. No. 6,143,556). This patent is the direct continuation of U.S. Pat. No. 6,524,843, which claimed a way to remove $CO_2$ from gases with an enzyme, the carbonic anhydrase. This new patent aims at improving the $CO_2$ absorption of the previous patent through the additional use of solvents, increasing the performance of the bioreactor.

$CO_2$ transformation may be catalyzed by a biocatalyst. The biocatalyst is preferably the enzyme carbonic anhydrase. $CO_2$ transformation reaction is the following:

$$CO_2 + H_2O \rightleftharpoons HCO_3 + H^+ \qquad (6)$$

Under optimum conditions, the turnover rate of this reaction may reach $1 \times 10^6$ molecules/second (Khalifah, R and Silverman D. N., Carbonic anhydrase kinetics and molecular function, The Carbonic Anhydrase, Plenum Press, New York, pp. 49-64, 1991).

SUMMARY OF THE INVENTION

A first object of the present invention is to provide a $CO_2$ absorption solution with an increased $CO_2$ absorption rate.

In accordance with the present invention, that object is achieved with a formulation for absorbing $CO_2$ containing water, at least one $CO_2$ absorption compound, and carbonic anhydrase as an activator to enhance the absorption capacity of the $CO_2$ absorption compound.

A $CO_2$ absorption compound in accordance with the present invention represents any compound known in the field which is capable to absorb gaseous $CO_2$.

Preferably, the $CO_2$ absorption compound is selected from the group consisting of amines, alkanolamines, dialkylether of polyalkylene glycols and mixtures thereof.

By "amines" (as also in the term "alkanolamines"), it is meant any optionally substituted aliphatic or cyclic amines or diamines.

More preferably, the amines are selected from the group consisting of piperidine, piperazine and derivatives thereof which are substituted by at least one alkanol group.

By "alkanol", as in the terms "alkanol group" or "alkanolamines", it is meant any optionally substituted alkyl group comprising at least one hydroxyl group.

Advantageously, the alkanolamines are selected from the group consisting of monoethanolamine (MEA), 2-amino-2-methyl-1-propanol (AMP), 2-(2-aminoethylamino)ethanol (AEE), 2-amino-2-hydroxymethyl-1,3-propanediol (Tris), N-methyldiethanolamine (MDEA) and triethanolamine.

The preferred dialkylether of polyalkylene glycols used according to the invention are dialkylether of polyethylene glycols. Most preferably, a dialkylether of polyethylene glycol is a dimethylether of polyethylene glycol.

A second object of the invention is to provide a method to activate a $CO_2$ absorption solution, which comprises the steps of:

contacting gaseous $CO_2$ with an aqueous $CO_2$ absorption solution containing at least one $CO_2$ absorption compound; and adding carbonic anhydrase to said $CO_2$ absorption solution while it is contacted with said gaseous $CO_2$.

Carbonic anhydrase is used as an activator to enhance performance of absorption solutions (for chemical/physical absorption) for $CO_2$ capture.

Thus, a third object of the invention concerns the use of carbonic anhydrase as an activator to increase $CO_2$ absorption rate in an aqueous solution used for $CO_2$ absorption.

The enzyme may be one of the constituents of the absorption solution or it can be fixed to a solid substrate (support) such as packing material onto which the absorption solution, in contact with gaseous $CO_2$, flows.

The objects, advantages and other features of the present invention will be better understood upon reading of the following non-restrictive description of preferred embodiments thereof, given for the purpose of exemplification only, with reference to the accompanying figures and examples.

DESCRIPTION OF PREFERRED EMBODIMENTS

Figure 1:
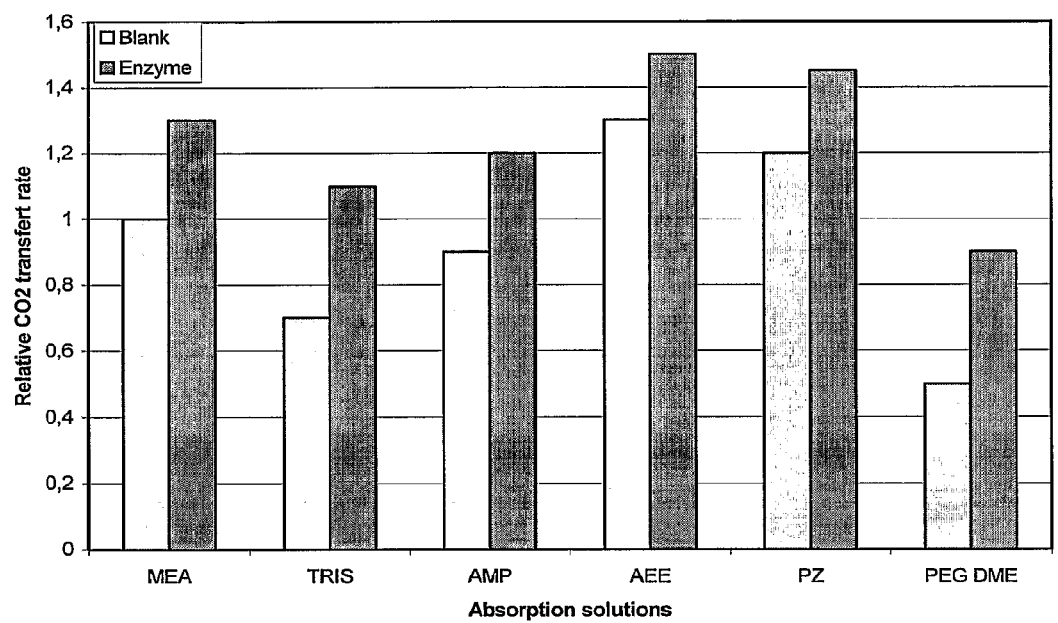
FIG. 1 represents the performance, with or without using carbonic anhydrase, of absorption solutions comprising MEA, Tris, AMP, AEE, Pz or PEG DME as the $CO_2$ absorption compound; the performance is expressed as the relative $CO_2$ transfer rate of the given solution to the $CO_2$ transfer rate of a MEA solution without carbonic anhydrase, the concentration of the absorption solutions is $1.2 \times 10^{-2}$ M.

The activation of an absorption solution by carbonic anhydrase may be obtained (1) by directly adding carbonic anhydrase to the absorption solution or (2) by contacting an absorption solution, in contact with a gas phase containing $CO_2$, to a solid support having immobilized carbonic anhydrase.

Carbonic anhydrase enhances performance of absorption solutions by reacting with dissolved $CO_2$, maintaining a maximum $CO_2$ concentration gradient between gas and liquid phases and then maximizing $CO_2$ transfer rate.

The following examples present the two ways to activate absorption solutions with carbonic anhydrase.

Example 1

An experiment was conducted in an absorption column. The absorption solution is an aqueous solution of 2-amino-2-hydroxymethyl-1,3-propanediol (0.15% (w/w)). This absorption solution is contacted countercurrently with a gas phase with a $CO_2$ concentration of 52,000 ppm. Liquid flow rate was 1.5 L/min and gas flow rate was 6.0 g/min. Gas and absorption solution were at room temperature. Operating pressure of the absorber was set at 5 psig. The column has a 7.5 cm diameter and a 70 cm height. Two tests were performed: the first with no activator, the second with carbonic anhydrase. The concentration of carbonic anhydrase is adjusted to 20 mg per liter of solution.

The results obtained showed that $CO_2$ removal rate is 1.5 time higher in the absorption solution containing carbonic anhydrase. $CO_2$ transfer rate was equal to $2.3 \times 10^{-3}$ mol/min with carbonic anhydrase.

Example 2

A gas, containing $CO_2$ at a concentration of 8% (v/v) is fed to a packed bed reactor containing immobilized carbonic anhydrase. The solid substrate is a polymeric material. The gas is countercurrently contacted to an aqueous absorption solution. Impact of the presence of the immobilized enzyme, as an activator, has been tested for chemical and physical solvents. Selected compounds for absorption solutions are monoethanolamine (MEA), piperazine (Pz), 2-amino-2-methyl-1-propanol (AMP), 2-(2-aminoethylamino)ethanol (AEE), 2-amino-2, hydroxymethyl-1,3-propanediol (Tris) and dimethyl ether of polyethylene glycol (PEG DME). Solutions were prepared at a concentration of $1.2 \times 10^{-2}$ M.

Operating conditions were the following: gas flow rate is 3.0 g/min, absorption solution flow rate is 0.5 L/min. Height of packing with immobilized enzyme 75 cm. Operating pressure is 1.4 psig.

Performance of absorption solutions are shown in FIG. 1. Performance is expressed as a relative $CO_2$ transfer rate:

$$\text{Performance} = \frac{CO_2 \text{ transfer rate of a given solution}}{CO_2 \text{ transfer rate of } MEA \text{ solution without carbonic anhydrase}}$$

From FIG. 1, it can be observed that carbonic anhydrase enhanced the $CO_2$ absorption of both chemical and physical absorption solutions.

Example 3

A gas, containing 8% of $CO_2$ (v/v) is fed to a packed bed reactor containing immobilized carbonic anhydrase. The solid substrate is a polymeric material. The gas is countercurrently contacted to an aqueous absorption solution. Selected compounds for absorption solutions are monoethanolamine (MEA), 2-amino-2-methyl-1-propanol (AMP), methyldiethanolamine (MDEA) and 2-amino-2, hydroxymethyl-1,3-propanediol (Tris). Solutions were prepared at a concentration of $1.44 \times 10^{-1}$ M.

Operating conditions were the following: gas flow rate is 1.0 g/min, absorption solution flow rate is 0.5 L/min. Height of packing is 25 cm. Operating pressure is 1.4 psig.

Figure 2:
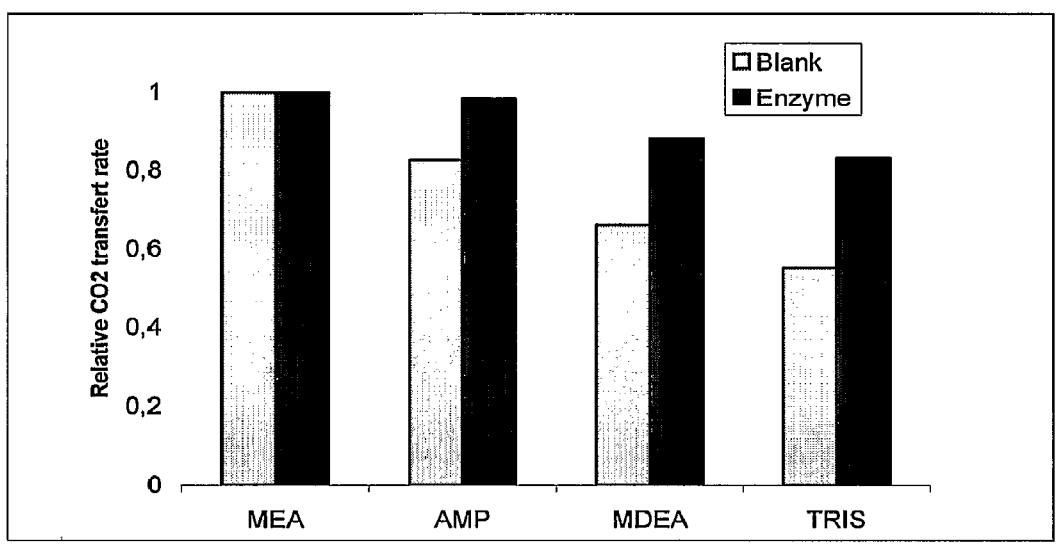
FIG. 2 represents the performance, with or without using carbonic anhydrase, of absorption solutions comprising MEA, AMP, MDEA or Tris as the absorption compound; the performance is expressed as the relative $CO_2$ transfer rate of the given solution to the $CO_2$ transfer rate of a MEA solution without carbonic anhydrase; the concentration of the absorption solutions is $1.44 \times 10^{-1}$ M.

Performance of absorption solutions are shown in FIG. 2. Performance is expressed as a relative $CO_2$ transfer rate:

$$\text{Performance} = \frac{CO_2 \text{ transfer rate of a given solution}}{CO_2 \text{ transfer rate of } MEA \text{ solution without carbonic anhydrase}}$$

From FIG. 2, it can be observed that carbonic anhydrase increased $CO_2$ absorption for all solutions, except for the MEA solution. The absence of increase between the test with and without enzyme is due to the fact that the efficiency of the MEA solution was of 100% under these conditions. In this particular example, a relative transfer rate of 1 equals to 100% $CO_2$ removal.

Example 4

A gas, containing 8% of $CO_2$ (v/v) is fed to a packed bed reactor containing immobilized carbonic anhydrase. The solid substrate is a polymeric material. The gas is countercurrently contacted to an aqueous absorption solution. Selected compounds for absorption solutions are monoethanolamine (MEA) and 2-amino-2-methyl-1-propanol (AMP). Solutions were prepared at a concentration of 87 mM.

Operating conditions were the following: gas flow rate is 3.0 g/min, absorption solution flow rate is 0.5 L/min. Height of packing is 25 cm. Operating pressure is 1.4 psig.

Figure 3:
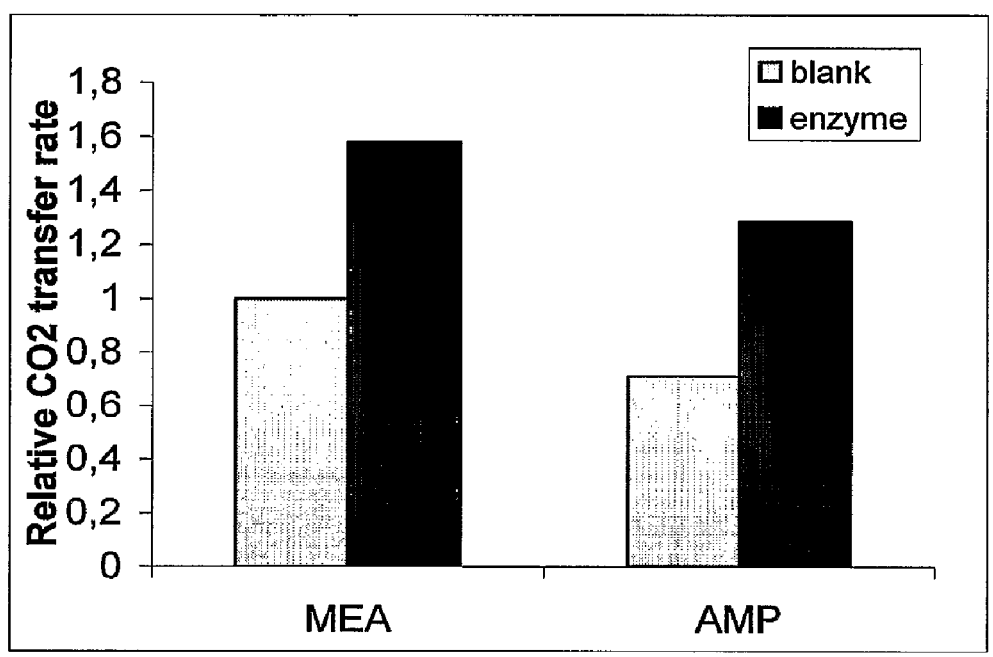
FIG. 3 represents the performance, with or without using carbonic anhydrase, of absorption solutions comprising MEA or AMP as the absorption compound; the performance is expressed as the relative $CO_2$ transfer rate of the given solution to the $CO_2$ transfer rate of a MEA solution without carbonic anhydrase. the concentration of the absorption solutions is $0.87 \times 10^{-1}$ M.

Performance of absorption solutions are shown in FIG. 3. Performance is expressed as a relative $CO_2$ transfer rate:

$$\text{Performance} = \frac{CO_2 \text{ transfer rate of a given solution}}{CO_2 \text{ transfer rate of } MEA \text{ solution without carbonic anhydrase}}$$

It can clearly be seen that carbonic anhydrase increases the absorption capacity of absorption solutions. This increase can be obtained both for amine-based chemical absorption solutions and physical solutions. Reduced costs with lower need for solvents could thus be obtained.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A formulation for the absorption of $CO_2$, comprising water and at least one $CO_2$ absorption compound selected from N-methyldiethanolamine (MDEA), piperazine (PZ), 2-(2-aminoethylamino)ethanol (AEE), diethanolamine (DEA) and 2-amino-2-methyl-1-propanol (AMP), the water and the at least one $CO_2$ absorption compound forming a solution; and carbonic anhydrase to enhance the absorption of the solution.

2. The formulation of claim 1, wherein the $CO_2$ absorption compound comprises AMP.

3. The formulation of claim 1, wherein the carbonic anhydrase is supported by a support.

4. The formulation of claim 1, wherein the carbonic anhydrase is immobilised on a support.

5. The formulation of claim 1, wherein the carbonic anhydrase is a component of the solution.

6. A method to enhance $CO_2$ absorption in an absorber, comprising:
   contacting a gas partially containing $CO_2$ with an aqueous $CO_2$ absorption solution comprising at least one $CO_2$ absorption compound selected from N-methyldiethanolamine (MDEA), piperazine (PZ), 2-(2-aminoethylamino)ethanol (AEE), diethanolamine (DEA) and 2-amino-2-methyl-1-propanol (AMP); and
   providing carbonic anhydrase to enhance the absorption of the aqueous $CO_2$ absorption solution; and
   operating the absorber such that the carbonic anhydrase enables an increase in $CO_2$ transfer rate relative to the same absorption solution without the carbonic anhydrase.

7. The method of claim 6, wherein the $CO_2$ absorption compound comprises AMP.

8. The method of claim 6, wherein the carbonic anhydrase is supported by a support.

9. The method of claim 6, wherein the carbonic anhydrase is immobilised on a support.

10. The method of claim 6, wherein the carbonic anhydrase is a component of the solution.

11. A method to enhance $CO_2$ absorption, comprising:
    contacting a gas partially containing $CO_2$ with an aqueous $CO_2$ absorption solution in a reactor, the aqueous $CO_2$ absorption solution comprising at least one secondary or tertiary alkanolamine $CO_2$ absorption compound;
    providing carbonic anhydrase to enhance the absorption of the aqueous $CO_2$ absorption solution; and
    operating the reactor such that the carbonic anhydrase enables an increase in $CO_2$ transfer rate relative to the same absorption solution without the carbonic anhydrase.

12. The method of claim 11, wherein the carbonic anhydrase is immobilised on supports.

13. The method of claim 12, wherein the supports comprise packing within the reactor and the aqueous $CO_2$ absorption solution flows onto the packing.

14. The method of claim 11, wherein the carbonic anhydrase is directly present in and flows with the $CO_2$ absorption solution.

15. The method of claim 14, wherein the carbonic anhydrase is free in the $CO_2$ absorption solution.

16. The method of claim 11, wherein the $CO_2$ absorption compound comprises a secondary alkanolamine.

17. The method of claim 16, wherein the $CO_2$ absorption compound comprises PZ.

18. The method of claim 11, wherein the $CO_2$ absorption compound comprises a tertiary alkanolamine.

19. The method of claim 11, wherein the $CO_2$ absorption compound comprises MDEA.

* * * * *